(12) United States Patent
Kapitza et al.

(10) Patent No.: US 8,844,237 B2
(45) Date of Patent: Sep. 30, 2014

(54) WIND POWER PLANT AND WIND POWER PLANT TOWER SEGMENT

(75) Inventors: Jan Kapitza, Grossefehn (DE); Panos Papadopoulos, Aurich (DE); Norbert Hölscher, Aurich (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 13/575,274

(22) PCT Filed: Jan. 27, 2011

(86) PCT No.: PCT/EP2011/051116
§ 371 (c)(1),
(2), (4) Date: Oct. 10, 2012

(87) PCT Pub. No.: WO2011/092235
PCT Pub. Date: Aug. 4, 2011

(65) Prior Publication Data
US 2013/0025229 A1 Jan. 31, 2013

(30) Foreign Application Priority Data
Jan. 27, 2010 (DE) .......................... 10 2010 005 991

(51) Int. Cl.
*E04H 12/00* (2006.01)
*F03D 11/04* (2006.01)
*E04H 12/12* (2006.01)

(52) U.S. Cl.
CPC ........... *F03D 11/04* (2013.01); *F05B 2240/302* (2013.01); *Y02E 10/721* (2013.01);
(Continued)

(58) Field of Classification Search
CPC ............. E04C 2/04; E04C 2/044; E04C 2/06; E04C 2/26; E04C 3/00; E04C 3/20; E04C 3/26; E04C 3/293; E04C 5/00; E04C 5/01; E04C 5/0627; E04C 5/0636; E04C 5/081; E04C 5/12; E04C 5/16; E04B 1/02; E04B 1/04; E04B 1/043; E04B 1/08; E04B 1/18; E04B 1/20; E04B 1/21; E04B 1/215; E04B 1/612; E04B 1/38; E04B 1/34807; E04B 1/34823; E04H 12/00; E04H 12/12; E04H 12/16; E04H 12/342
USPC ......... 52/651.01, 651.07, 835, 838, 841, 843, 52/844, 845, 848, 849, 854, 250, 253, 258, 52/259, 382, 383, 583.1, 587.1, 600, 601, 52/604
See application file for complete search history.

(56) References Cited

U.S. PATENT DOCUMENTS 4,182,092 A 1/1980 Weaver
4,781,006 A * 11/1988 Haynes ........................ 52/583.1
(Continued)

FOREIGN PATENT DOCUMENTS

EP 1 889 988 A2 2/2008
EP 2 253 782 A1 11/2010
(Continued)

*Primary Examiner* — Jessica Laux
(74) *Attorney, Agent, or Firm* — Seed IP Law Group PLLC

(57) ABSTRACT

A wind power plant tower segment is provided. The tower segment is designed as a jacket segment and comprises a reinforced concrete body, comprising two faces for attaching to faces of at least one further tower segment. In the region of each face, at least one connecting body is introduced in the reinforced concrete body and anchored therein for connecting to a connecting body of an adjoining tower segment. The connecting body comprises a fastening wall that is disposed substantially parallel to the respective face for absorbing a tensile load that is directed transversely to the face and transversely to the fastening wall. A wind power installation pylon having a plurality of such pylon segments, a wind power installation having a corresponding pylon, and a process for the production of a plurality of pylon segments is also provided.

16 Claims, 6 Drawing Sheets

(52) U.S. Cl.
CPC ..... *F05B 2260/301* (2013.01); *F05B 2240/912* (2013.01); *E04H 12/12* (2013.01); *Y02E 10/728* (2013.01)
USPC ........... 52/651.01; 52/601; 52/604; 52/583.1; 52/845

(56) References Cited

U.S. PATENT DOCUMENTS

| | | | |
|---|---|---|---|
| 5,761,862 | A | 6/1998 | Hendershot et al. |
| 7,726,091 | B2 * | 6/2010 | Frohlich et al. ................. 52/707 |
| 7,765,766 | B2 | 8/2010 | Gomez et al. |
| 8,381,487 | B2 * | 2/2013 | Gomez et al. .............. 52/745.18 |
| 8,505,244 | B2 | 8/2013 | Gomez et al. |
| 2009/0025304 | A1 * | 1/2009 | Irniger et al. .................... 52/40 |

FOREIGN PATENT DOCUMENTS

| | | |
|---|---|---|
| JP | S47-40812 A | 12/1972 |
| JP | 2008101363 A1 | 5/2008 |
| WO | 2008/031912 A1 | 3/2008 |
| WO | 2010/134029 A2 | 11/2010 |
| WO | 2011/058158 A1 | 5/2011 |
| WO | 03/069099 A1 | 8/2013 |

* cited by examiner

A-A

WIND POWER PLANT AND WIND POWER PLANT TOWER SEGMENT

BACKGROUND

1. Technical Field

The present disclosure concerns a wind power installation pylon segment and a wind power installation pylon having a plurality of such pylon segments and a wind power installation having a corresponding pylon. The disclosure further concerns a process for the production of a plurality of such pylon segments.

2. Description of the Related Art

Nowadays a modern wind power installation usually includes a foundation on which is arranged a wind power installation pylon carrying a pod in which there is accommodated a generator, the rotor of which is rotated by an aerodynamic rotor for energy generation with a suitable wind. Pylons of such wind power installations can be of heights of over 100 m. Besides steel pylons, concrete pylons consisting of steel reinforced concrete and/or prestressed concrete are frequently used. In that respect the term concrete pylon is used to mean that it is predominantly made from concrete. An upper portion can frequently be made from steel.

Such a pylon is substantially of a tubular shape and usually differs from a strictly cylindrical shape in that it decreases in diameter from the foundation to the pod. Such a concrete pylon is usually constructed from a plurality of precast concrete parts. In a vertical direction such a pylon has a plurality of mutually superposed pylon portions which are usually fixedly braced together in the vertical direction by bracing cables. Each of those pylon portions or at least pylon portions from the lower region of the concrete pylon are composed of outer peripheral casing segments. For example a pylon portion can be composed of two half-shells which basically each form a 180 degrees segment of the pylon portion. Those pylon portions are mostly prefabricated industrially in the form of precast concrete parts and are assembled and joined together on site when constructing the pylon. The need to subdivide the pylon portions into a plurality of segments is usually due to necessary transport of the components from their location of manufacture to the location at which the wind power installation is erected.

Pylon segments of a pylon portion, which can also be referred to as the pylon section, are usually assembled on site at perpendicular joint edges. Portions of the reinforcement project out at those joint edges so that here the segments can be connected together by means of a locking bar. The remaining vertical gap is then mortared.

A disadvantage in this respect is that a quite large amount of manual work is required for connecting the pylon segments together. The mortar filling also hides the danger of corrosion of the reinforcement portions in that region, particularly if the mortaring operation is not effected correctly or is defective. In that respect, mistakes or defects can occur even when the operation is implemented carefully. Such defects can be, for example, enclosed water and air bubbles or capillaries leading outwardly from the reinforcement.

In addition, the positional accuracy that can be achieved with such pylon segments relative to each other is limited and is usually in the range of +10 mm. Furthermore the mortaring operation can be problematical in winter at low temperatures.

BRIEF SUMMARY

Embodiments of the present invention overcome or reduce at least one of the aforementioned problems. In particular, embodiments of the invention simplify the operation of connecting a plurality of pylon segments together and/or improve in respect of positional accuracy and/or reliability and/or durability.

According to at least one embodiment of the invention, there is proposed a pylon segment. Such a pylon segment is in the form of an outer peripheral casing segment and is prepared for being assembled to at least one further such or similar pylon segment to provide a pylon portion, which is also referred to as a pylon section. In that respect, the term pylon portion is used to denote a tubular portion which is closed in the peripheral direction. A pylon has a plurality of mutually superposed pylon portions.

The pylon segment has a steel reinforced concrete body and thus a concrete body provided with a reinforcement. For assembly to at least one further pylon segment there are provided two joints for attachment to joints of at least one further, in particular similar or identical pylon segment arranged in the same plane in order thereby be able to manufacture a pylon portion. Such a joint is a surface and is substantially or at a maximum of a length in accordance with the height of the pylon segment and is of a width in accordance with the thickness of the pylon segment, that is to say the wall thickness of the pylon segment. In other words, such a joint corresponds to a sectional surface of a perpendicular section through the pylon segment, in which respect the joint can possibly be somewhat smaller and in particular somewhat narrower.

At least one connecting body is let into the region of each joint and anchored therein. Such a connecting body is provided and adapted to be connected to a further connecting body of the adjacent pylon segment. In that case, the two connecting bodies can be in contact with each other or there is at least a little different material therebetween, in particular concrete. The connecting body has a fixing wall arranged substantially parallel to the respective joint, for carrying a tensile loading directed transversely relative to the joint and the fixing wall. Here a fixed connection can be made between the connecting body and a connecting body of a further pylon segment. That provides for a firm connection of the aforementioned pylon segments with each other, by virtue of the connecting body being anchored in the steel reinforced concrete body. In that respect, preferably a plurality of connecting bodies are arranged along a joint, in particular at equal spacings.

According to at least some embodiments of the invention, therefore two pylon segments can be fixedly connected together in joint-on-joint relationship. A high degree of accuracy is achieved with that connection, such accuracy being substantially determined by the production accuracy of the pylon segments.

Preferably the pylon segment is a precast concrete part. Such a precast concrete part can be industrially prefabricated, whereby it is possible to achieve a high quality and thus strength for the steel reinforced concrete body. A high degree of accuracy and quality for the joints can also be achieved.

Preferably the connecting body is in the form of a connecting box or steel recess. The terms connecting box and steel recess are used synonymously hereinafter.

The connecting box has preferably a plurality of and in particular three side walls adjoining the fixing wall in order thereby to form a cavity, in particular a recess. The side walls and the fixing wall are in that case fixedly connected together. In that arrangement the connecting body also has an open side accessible from the outside, wherein the connecting body is fixedly connected to reinforcing bars which are let into the steel reinforced concrete body so that the connecting body is thereby anchored in the steel reinforced concrete body. The cavity is accessible through the open side accessible from the exterior. In other words it is possible to gain access to the cavity from outside the pylon segment. In that respect, the pylon segment is preferably so constructed that it is possible admittedly to gain access to the cavity from outside the pylon segment, but from within the interior of a wind power installation pylon which has been constructed or which is to be constructed. That outwardly open cavity or the outwardly open recess would accordingly not be exposed to weathering influences at the exterior of the wind power installation or at any event to fewer weathering influences.

In an embodiment there is proposed a pylon segment which is characterized in that a first of the side walls is opposite the open side and at least one reinforcing bar connected to the first side wall is inclined relative to at least one reinforcing bar connected to one of the other side walls through an angle of inclination, wherein the angle of inclination is preferably in the range of about 2 to 8 degrees, further preferably in the range of about 3 to 5 degrees and in particular is about 4 degrees.

By virtue of the provision of angles of inclination of the reinforcing bars relative to each other and thus the fixing of the reinforcing bars to the connecting body at different angles of inclination, forces can be diverted in a correspondingly different direction. In that way it is possible to take account of the tubular structure of the wind power installation pylon and thus the curved shape of the pylon segment. The angle of inclination can be in the range of 2 to 8 degrees, which can depend on particular on the pylon diameter in the region of the pylon segment in question. The smaller the diameter, the correspondingly greater can be the angle of inclination. Angles of inclination of 3 to 5 degrees, in particular about 4 degrees, are advantageous for usual diameters.

Preferably the connecting body is so arranged in the steel reinforced concrete body and in particular is concreted therein that it is accessible from the exterior. In particular that also permits access to the connection implemented by way of the connecting body, to another connecting body of an adjoining segment. In contrast the reinforcing bars are so arranged and connected to the connecting body that they are completely enclosed in the pylon segment and are thus inaccessible from the exterior. That can provide corrosion protection for the reinforcing bars in a long term. In that arrangement, the reinforcing bars are substantially enclosed by concrete and at the connecting location in relation to the connecting body they are enclosed by the connecting body or screened off relative to the exterior.

A preferred fixing of the reinforcing bars to the connecting body is effected by means of welding. That makes it possible to achieve a permanent and strong connection, by way of which in addition high forces can be transmitted.

A further desirable configuration proposes that the fixing wall terminates approximately with the joint and/or the fixing wall has at least one fixing opening for passing therethrough at least one tensioning means, in particular a screw, in order by said tensioning means to transmit a tensile loading from a further pylon segment to the fixing wall.

The statement that the fixing wall terminates approximately with the joint signifies that the connecting body is let into the steel reinforced concrete body in such a way that an outside surface of the connecting wall forms a part of the joint, that is to say the contact surface with an adjacent segment. That makes it possible to provide for direct contact of the connecting bodies with each other when two segments are fitted together at their joint and the connecting bodies are correspondingly arranged at both joints. In a corresponding fashion, it is also possible to provide that the connecting bodies, and thus the segments, are fixedly connected in a simple fashion. The two segments are thus directly fixed in joint-to-joint relationship so that it is possible substantially or completely to remove the need for mortar filling. An elastic sealing material can be provided in some embodiments.

Reinforcing bars can also be connected to the connecting body in such a way that they are not accessible from the exterior, for the situation where the fixing wall terminates approximately with the joint. In other words the reinforcing bars can be fixed to the connecting body in somewhat set-back relationship with the joint.

The provision of at least one fixing opening in the fixing wall for passing therethrough a tensioning means such as a screw makes it easily possible to provide a fixing option and ultimately also a bracing option for two connecting bodies in relation to each other. Thus, such a screw or threaded rod can connect two adjacent connecting bodies of two adjacent pylon segments. If the connecting body is in the form of a connecting box with a cavity or recess which is accessible from the exterior, the fixing operation and in particular the screw-tightening operation can be effected in relation to both connecting bodies which are to be connected together, in that cavity or recess.

That makes it possible to achieve a strong and also highly precise joint-to-joint connection between two segments because the operation of making the fixed connection or tightening the connection is not effected in the region of the contact surface or join, but in the recesses or cavities which are accessible from the exterior. In order finally to additionally counteract corrosion and in particular also corrosion of the connecting bodies, it is proposed that after conclusion of the fixed connection, a rubber sheathing is provided for the cavities or recesses.

According to some embodiments of the invention, it is further proposed that a wind power installation pylon is at least in part constructed from pylon segments according to embodiments of the invention. In that case, at least two pylon segments are assembled in plane-wise relationship to provide a pylon portion or pylon section, wherein the pylon segments are fitted together in joint-to-joint relationship and are connected together by way of the connecting bodies. Such pylon portions are then arranged in mutually superposed relationship, wherein higher pylon portions usually become increasingly smaller in diameter. The pylon portions in that case are so arranged in mutually superposed relationship that adjacent pylon portions have mutually displaced joints or mutually displaced gaps formed in the region of the joints.

Preferably, there is provided a wind power installation having a wind power installation pylon according to embodiments of the invention or a plurality of pylon segments according to embodiments of the invention. The operational life of the wind power installation can sometimes also be prolonged or maintenance intervals extended by the use of pylon segments according to embodiments of the invention or a pylon according to embodiments of the invention.

According to some embodiments of the invention there is also proposed a process for the production of a plurality of pylon segments for a wind power installation pylon.

In accordance therewith a plurality of pylon segments are simultaneously produced in a mould or shuttering. For that purpose a reinforcement and the connecting bodies including the anchoring thereof are prepared in the mould or shuttering in question for each respective one of the pylon segments to be produced at the same time. In that respect, anchorage can signify welding the connecting bodies to some reinforcing bars of the reinforcement. In that respect it is not an important consideration whether such welding is effected on site in the mould or is effected previously in a further preparatory step.

When the reinforcement and the connecting bodies are in their positions the mould can be filled up with concrete. The concrete must now initially set before it can be removed. Removal usually means that the concrete firstly remains in place and rather the mould or shuttering which here is generally of a multi-part configuration is removed.

The concrete mould or shuttering is provided for a complete pylon portion, that is to say a tubular casing portion which is completely closed in the peripheral direction. A corresponding concrete part and in particular a corresponding steel reinforced concrete body is thus produced when concrete setting occurs as described above. The connecting bodies provided are accordingly always arranged in pairs, more specifically there is always a respective connecting body for each two adjacent pylon segments.

For transport purposes the resulting pylon segments, such as, for example, two half-shells, are separated. At the location for erection of the wind power installation those segments are now assembled again in the way in which they were already arranged relative to each other in the described manufacturing process in the concrete mould. That makes it possible to achieve a high level of manufacturing accuracy and in particular very good adaptation of the pylon segments to be connected, to each other, as they were already necessarily adapted to each other in the mould. Separation of the pylon segments produced in that way in a concrete mould can be effected, for example, by the provision of separation layers at the joints, like a separation plate.

The use of closure means, such as, for example, a rubber sheathing, makes it possible to prevent the cavity or the recess of a connecting body becoming clogged when the concrete is introduced into the mould.

According to embodiments of the invention, there is also proposed a connecting body, in particular a steel recess, as has already been described hereinbefore in connection with a pylon segment. That connecting body includes: a connecting wall for attachment to a connecting wall of a second connecting body, a first side wall connected to the connecting wall, and two second side walls which are connected to the connecting wall and the first side wall so that the connecting wall, the first side wall and the two second side walls together form a recess.

A pylon segment can thus be furnished by the provision of such a connecting body and the construction of a wind power installation pylon from such pylon segments can be simplified.

Preferably two different connecting bodies which are respectively adapted to each other are provided as the connecting bodies. In the joint region in which they are fitted together, one has a depression and the other has a corresponding raised portion. Preferably therefore such connecting bodies are prepared in pairs and fitted in pylon segments in such a way that the corresponding connecting bodies, and in particular steel recesses, come to bear against each other and the corresponding regions engage into each other. Thus it is also proposed that there be provided a pylon segment which has two joint sides for attachment to one or two other joint sides of another pylon segment. At the one joint side a first connecting body having a depression is then next fitted and at the other joint side at least one second connecting body with a corresponding raised portion is fitted. In that way there can be provided a plurality of pylon segments which are then suitably assembled when erecting a wind power installation pylon.

BRIEF DESCRIPTION OF THE SEVERAL VIEWS OF THE DRAWINGS

The invention is described by way of example hereinafter by means of embodiments with reference to the accompanying Figures.

DETAILED DESCRIPTION

Hereinafter identical references can denote similar elements of different embodiments.

Figure 1:
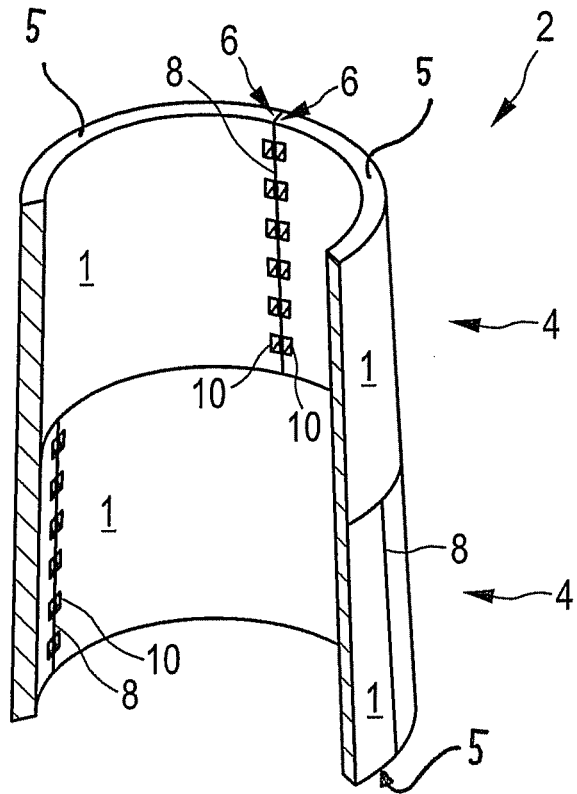
FIG. 1 shows a perspective partly sectional view of a region of a wind power installation pylon according to the invention.

FIG. 1 shows a region 2 of a wind power installation pylon according to one embodiment of the invention as a perspective partly sectional view. The region 2 is composed of two pylon portions 4 or pylon sections 4 which are arranged one above the other on their end faces 5. Each pylon portion 4 is respectively composed of two pylon segments 1. Two respective pylon segments 1 are assembled at joints 6. In the region of two joints 6 there is a respective gap or join 8 which however is comparatively thin and which can basically be disregarded. In actual fact, a gap is avoided by the abutting joint-to-joint arrangement. Arranged in the region of each joint 6 are six connecting bodies, of which the recess 10 that is accessible from the exterior can be seen here. Thus six pairs of connecting bodies and thus six pairs of recesses 10 are arranged at each gap 8. In that case, the connecting bodies are connected together in pairs. Screws can be tightened in the recesses for making the connection.

The gaps 8 of the lower pylon portion 4 are arranged displaced relative to the gaps 8 of the upper pylon portion 4 of the wind power installation pylon region 2 shown in FIG. 1. Thus the gaps 8 of mutually superposed pylon portions 4 are not in alignment, whereby the overall stability of the wind power installation pylon can be improved.

Figure 2:
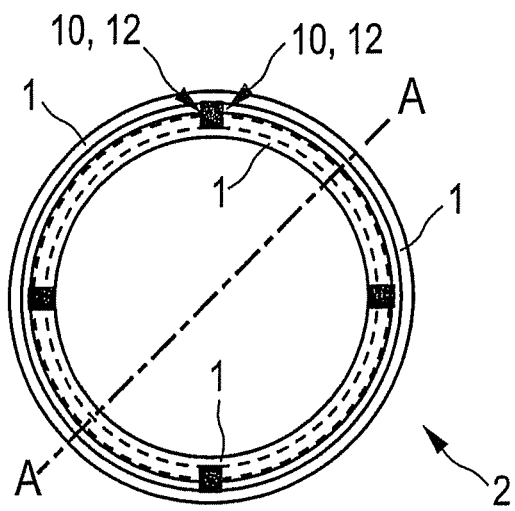
FIG. 2 shows a plan view of the non-sectioned region of a wind power installation pylon as shown in FIG. 1.
Figure 3:
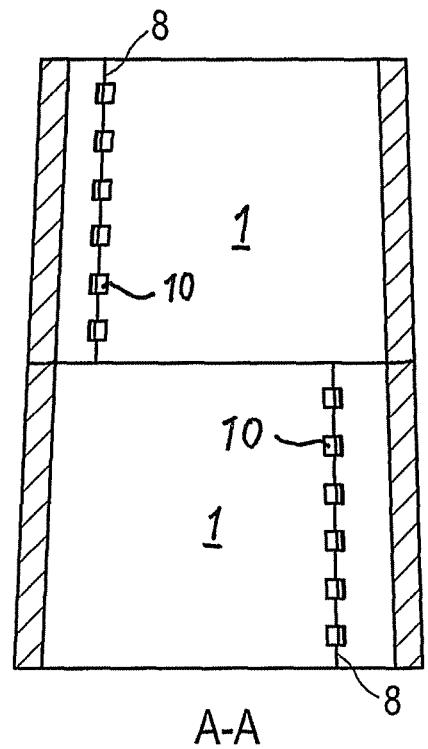
FIG. 3 shows a sectional side view along section line A-A in FIG. 2.
Figure 4:
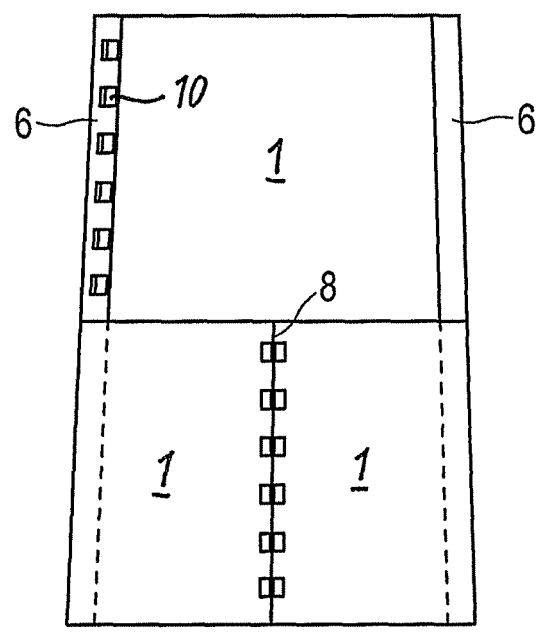
FIG. 4 shows a further view of a region of a wind power installation pylon as shown in FIG. 1.

The displacement of the connecting bodies 12 and therewith the recesses 10 can be particularly clearly seen from the plan view in FIG. 2. FIG. 2 also clearly shows that each pylon portion 4 is composed of two pylon segments 1 in the shape of half-shells. FIGS. 3 and 4 show further views of the region 2 of the wind power installation pylon.

Figure 5:
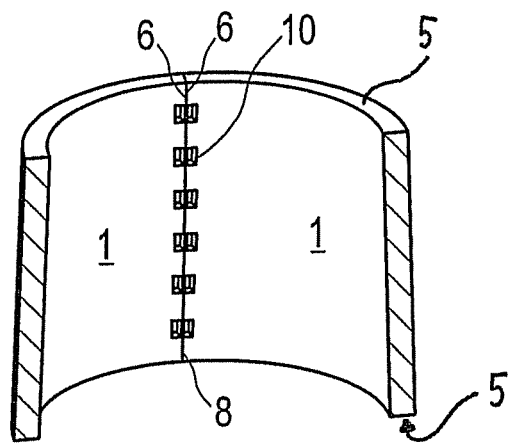
FIG. 5 shows a perspective sectional view of a pylon portion assembled from two pylon segments according to one embodiment of the invention.
Figure 6:
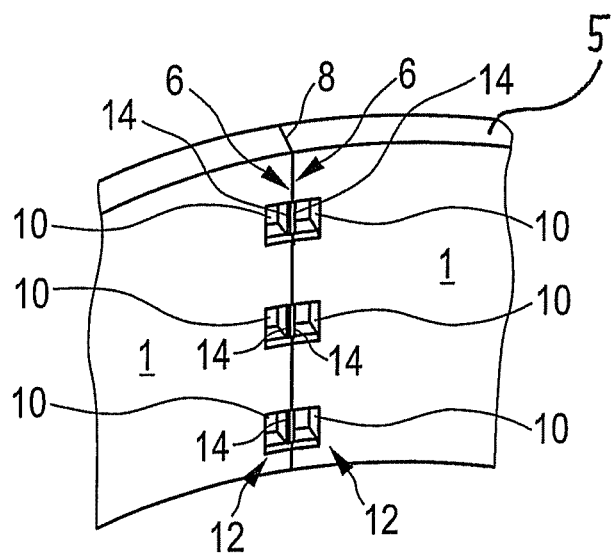
FIG. 6 shows a part from a joint region of two interconnected pylon segments according to one embodiment the invention.

FIG. 5 shows a further view in isolation of two pylon segments 1 which are fitted together and connected at their joints 6. The cut-out portion shown in FIG. 6 illustrates the arrangement of two pylon segments 1 in the region of their joints 6. Each two connecting bodies, of which only some can be seen in FIG. 5, are arranged opposite each other in the region of the joints 6 and thus in the region of the gap 8 and are fixed to each other. For that purpose each connecting body 12 has a connecting wall 14.

In that case, each connecting body 12 is let or concreted into the pylon segment 1 in such a way that the respective connecting wall 14 terminates with the respective joint 6. Because a respective connecting body 12 of the one pylon segment 1 is arranged at the same height as the connecting body 12 of another pylon segment 1, their connecting walls 14 are respectively in contact in the region of the adjoining joints 6 or the gap or join 8. Due to the paired relationship of two connecting bodies 12 they can thus be directly connected together and fixedly screwed together in order thereby to provide a firm connection between the pylon segments 1.

It will also be clear from FIG. 6 that the two pylon segments 1 can be fitted flat against each other in the region of their joints 6. The gap or join 8 is basically vanishingly small and basically only appears at the surface.

It can also be seen from FIGS. 1 to 6 that the recesses 10 are accessible from outside the respective pylon segment 1 but in that case from the interior of the wind power installation pylon. In particular, FIG. 1 also shows in the view at bottom right a gap or join 8 which faces towards the outside of the pylon. No recesses 10 can be seen there and they are therefore not accessible from the outside of the pylon from the exterior of the wind power installation.

Figure 7:
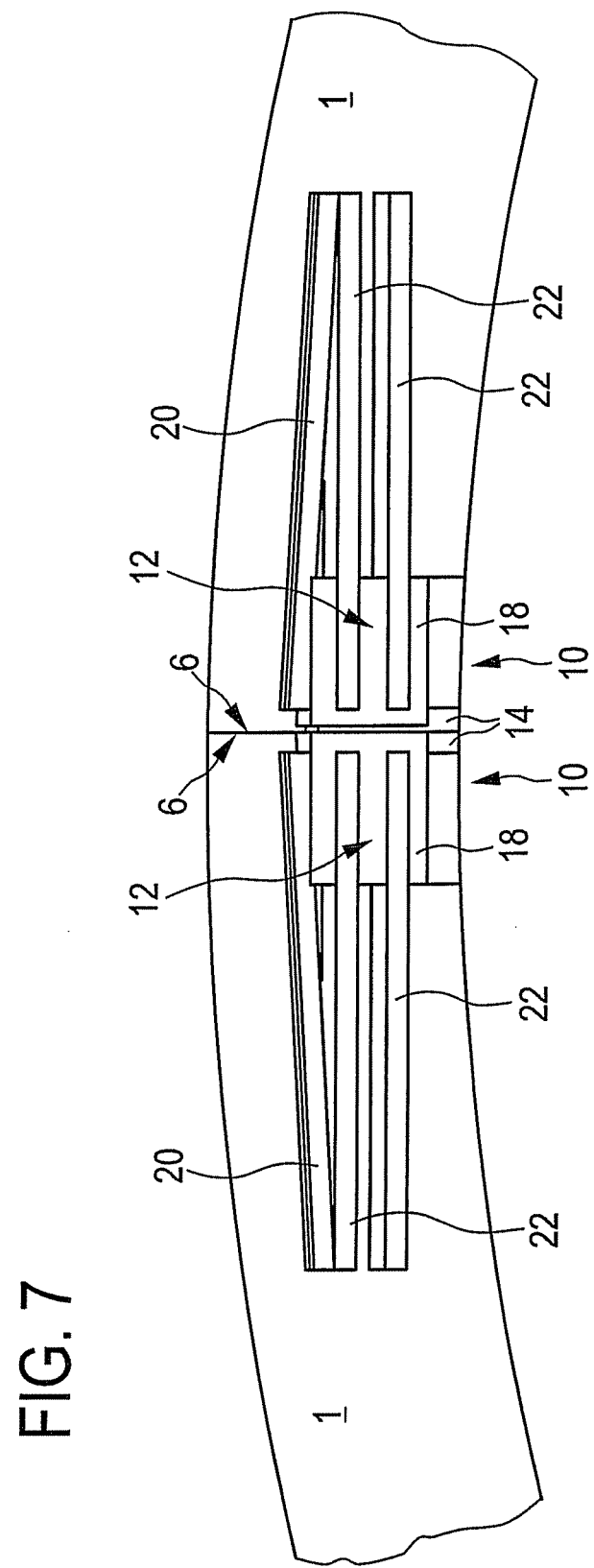
FIG. 7 shows a portion of two pylon segments according to one embodiment of the invention in a joint region as a plan view and a partly sectional view.

FIG. 7 shows a plan view of a partly sectional cut-away portion of two pylon segments 1 which are fitted to each other. It is to be seen that any sectional surfaces are not provided with hatching, for the sake of improved clarity of the drawing. The two pylon segments 1 in FIG. 7 are fitted together in the region of their joints 6. In this case FIG. 7 does not show any intermediate space between the joints 6.

The sectional view on an enlarged scale makes the structure of the connecting bodies 12 clearer, which essentially each have respective connecting walls 14 which bear against each other in the region of the joints 6. Each connecting body 12 has a first side wall which, however, cannot be seen in the FIG. 7 view. In addition, a second side wall 18 of each connecting body 12 is shown. Each second side wall 18 is respectively connected to the connecting wall 14 in question.

First reinforcing bars 20 are fixed to the first side wall and second reinforcing bars 22 are fixed to each second side wall 18. The first reinforcing bars 20 are slightly inclined relative to the second reinforcing bars 22. For example, in the illustrated embodiment of FIG. 9, the inclination is about 4 degrees. Further angles of inclination can possibly be provided between the reinforcing bars.

Thus, the connecting bodies 12 are fixed together in the region of the connecting walls 14. Any forces are transmitted by the respective connecting wall 14 to the first side wall and the second side wall 18 and from there further by way of the first reinforcing bars 20 and second reinforcing bars 22 to the respective pylon segment in which the reinforcing bars 20 and 22 and thus the connecting bodies 12 are anchored.

Figure 8:
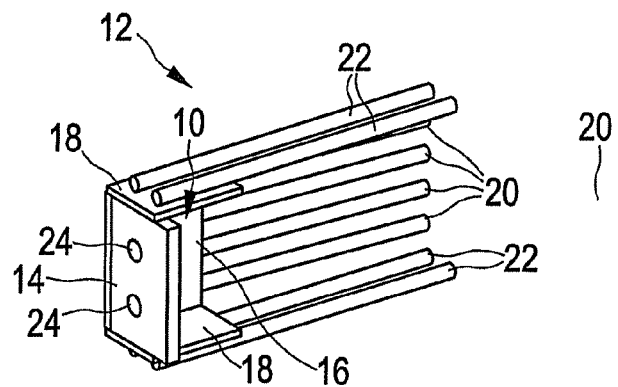
FIG. 8 shows a perspective view of a connecting body according to one embodiment of the invention.

The perspective view in FIG. 8 shows a connecting body 12 in the form of a connecting box or steel recess. It has a connecting wall 14 with a first side wall 16 connected thereto and two second side walls 18. The connecting wall 14, the first side wall 16 and the two second side walls 18 together form a recess. Two second reinforcing bars 22 are fixed to each second side wall 18 and four first reinforcing bars 20 are fixed to the respective first side wall 16. FIGS. 8 to 11 show the reinforcing bars 20, 22 of a terminated length. The reinforcing bars 20, 22 can, however, also be longer and in addition there can be a connection to further reinforcing elements, in a situation involving anchorage in the respective pylon segment 1.

FIG. 8 also shows two connecting openings 24 in the connecting wall 14. Those connecting openings 24 are basically in the form of bores and are suitable for passing a screw therethrough, in which case a screw head or a screw nut can bear against a surface of the connecting wall 14, that is towards the recess 10.

Figure 9:
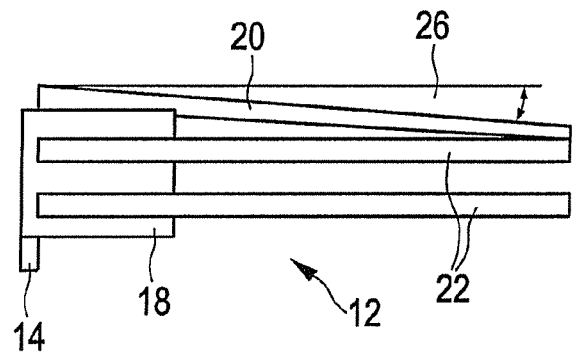
FIG. 9 shows a plan view of the connecting body of FIG. 8.

The plan view in FIG. 9 of the connecting body 12 shows a second side wall 18 and a part of the connecting wall 14. FIG. 9 is identified as a plan view as the present view corresponds to a direction of view from above downwardly for the case involving an appropriate arrangement in an erected wind power installation pylon. The inclination between the first reinforcing bars 20 and the second reinforcing bars 20 is identified as the angle of inclination 26 in FIG. 9.

Figure 10:
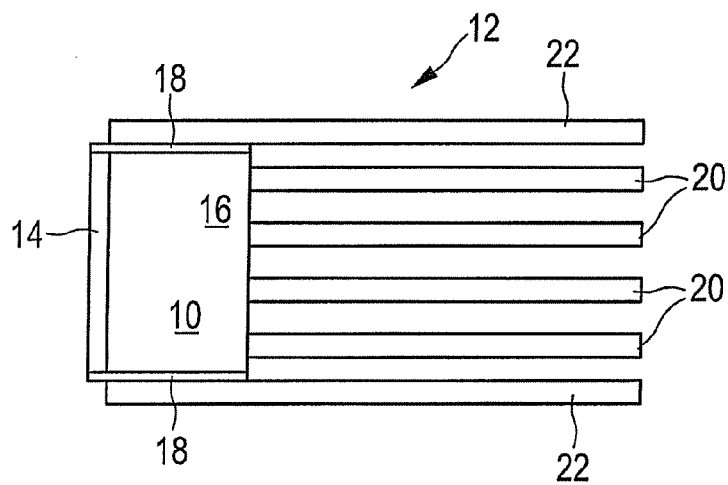
FIG. 10 shows a side view of the connecting body of FIG. 8.

FIG. 10 shows a view of the recess 10 in the connecting body 12. The recess 10 is provided between the first side wall 16, the connecting wall 14 and the two second side walls 18. It is also clear from FIGS. 8 to 10 that the reinforcing bars 20, 22 are arranged set back somewhat behind the connecting wall 14.

Figure 11:
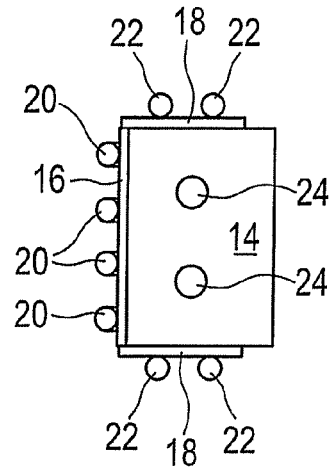
FIG. 11 shows a front view of the connecting body of FIG. 8.

The front view in FIG. 11 shows the arrangement of the connecting openings 24 in the connecting wall 14 and shows that the connecting wall 14 is basically bordered by three sides, namely the first side wall 16 and the two second side walls 18. The connecting wall 14 and therewith the connecting openings 24 are also bordered on three sides by the first and second reinforcing bars 20, 22 in order thereby ultimately to provide for load transmission by way of the connecting wall 14 to the reinforcing bars 20, 22 and from there into the corresponding steel reinforced concrete body of a pylon segment.

Figure 12:
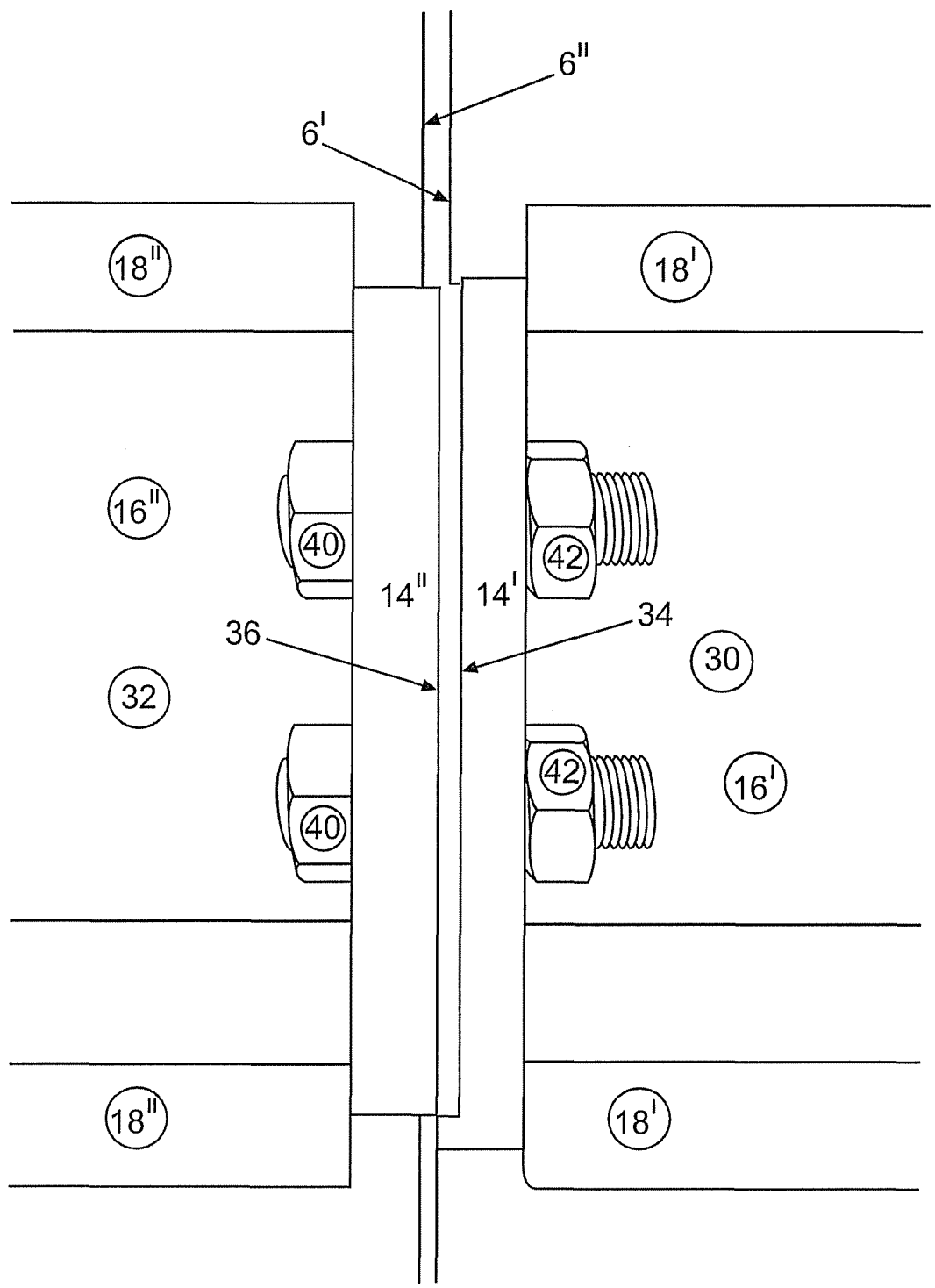
FIG. 12 shows a side view of a first and a second interconnected connecting body.

FIG. 12 shows a first connecting body 30 which is fixedly connected and screwed to a second connecting body 32 by means of screws and nuts 40 and 42 respectively. The connecting bodies 30 and 32 in this case are fitted to each other in the region of their connecting walls 14' and 14". In the region of the connecting wall 14' the first connecting body 30 has a depression 34. That depression thus also involves a depression relative to a joint 6' of the first connecting body 30. For that purpose the second connecting body 32 as a counterpart has a raised region or an elevated portion or a raised portion 36 in the region of its connecting wall 14". In this case the raised portion 36 also rises above a joint 6" and is provided for being fitted into the inset region or the depression 34, as shown in FIG. 12. That improves connecting properties, and it is possible at any event for the first connecting body and the pylon segment in which it is let to prevent the connecting body, namely the illustrated steel recess, from projecting, even when slight manufacturing tolerances are involved.

Moreover, the various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A wind power installation pylon segment, comprising:
a first steel reinforced concrete body with two vertical edges, each vertical edge being configured for attachment to a respective vertical edge of another steel reinforced concrete body to form a vertical joint; and
at least one connecting body fixedly attached to the first steel reinforced concrete body at one of the vertical edges, and anchored therein for connection to a connecting body of another steel reinforced concrete body, the at least one connecting body having a fixing wall that has a surface arranged substantially parallel to the vertical edge of the first steel reinforced concrete body, the fixing wall configured to carry a tensile loading directed transversely relative to the vertical edge and transversely relative to the fixing wall, the connecting body including a plurality of reinforcement bars having a first end located near a planar edge of the fixing wall, the plurality of reinforcement bars having a longitudinal axis that extends in a first plane, the first plane of the reinforcing bars forming an oblique angle with the planar edge of the fixing wall.

2. The pylon segment according to claim 1 wherein the pylon segment is a precast concrete part.

3. The pylon segment according to claim 1 wherein the connecting body is a structure having three side walls adjoining the fixing wall to form a recess, and wherein the connecting body has an open side accessible from an exterior of the pylon segment and the connecting body is anchored in the first steel reinforced concrete body by the reinforcing bars.

4. The pylon segment according to claim 3 wherein a first of the side walls is opposite the open side and at least one reinforcing bar is connected to the first side wall.

5. The pylon segment according to claim 1 wherein the connecting body is arranged in the steel reinforced concrete body and is accessible from an exterior of the pylon segment, and the reinforcing bars are connected to the connecting body and enclosed in the pylon segment.

6. The pylon segment according to claim 1 wherein the fixing wall has at least one fixing opening for passing therethrough at least one tensioning means to transmit a tensile loading from the adjacent pylon segment to the fixing wall.

7. A wind power installation pylon including a plurality of pylon segments according to claim 1, that are assembled to afford a pylon portion, wherein joints of adjacent pylon segments of a pylon plane are respectively fitted to each other, connecting bodies of adjacent pylon segments are arranged in adjacent paired relationship with each other and the adjacent connecting bodies are connected together so that the pylon segments are fixedly connected together by bolts extending through openings in the adjacent connecting bodies.

8. The pylon segment according to claim 1 wherein the oblique angle is between about 2 to 8 degrees.

9. A wind power installation pylon comprising:
a plurality of pylon segments, each pylon segment including:
a steel reinforced concrete body with two vertical edges, each vertical joint being configured for attachment to a vertical edge of another pylon segment; and
at least one connecting body fixedly attached to the steel reinforced concrete body in the region of the vertical joint and anchored therein for connection to a connecting body of the second pylon segment, and each connecting body having a fixing wall that has a surface arranged substantially parallel to the vertical joint for carrying a tensile loading directed transversely relative to the joint and transversely relative to the fixing wall, the connecting body including a plurality of reinforcement bars having an end portion that is located near a planar edge of the fixing wall and each of the plurality of reinforcement bars extending in a first plane, the first plane forming an obtuse angle with the planar edge of the fixing wall;
wherein each of the pylon segments are assembled to afford a pylon portion, wherein the vertical joints of adjacent pylon segments of a pylon plane are respectively fitted to each other, connecting bodies of adjacent pylon segments are arranged in adjacent paired relationship with each other and the adjacent connecting bodies are connected together so that the pylon segments are fixedly connected together thereby,
wherein the pylon has a plurality of pylon portions that are arranged in mutually superposed relationship and at least two pylon segments are respectively assembled to afford a pylon portion, and wherein joints of the pylon segments of a pylon portion are arranged in displaced relationship with joints of an adjacent pylon portion.

10. A wind power installation including a wind power installation pylon according to claim 9.

11. The wind power installation pylon according to claim 9 wherein the oblique angle is between about 2 to 8 degrees.

12. A wind power installation pylon segment, comprising:
a concrete body having a vertical surface configured to abut with a vertical surface of an adjacent pylon segment at a vertical joint;
a plurality of reinforcing bars located in the concrete body; and
at least one first connecting body fixedly attached to at least two of the plurality of reinforcing bars proximate each vertical joint and configured to attach to a second connecting body of the adjacent pylon segment, and each connecting body having a fixing wall with a surface that is substantially parallel to the concrete body at the vertical joint, wherein the plurality of reinforcement bars have a first end portion that is proximate a planar edge of the fixing wall, and wherein a longitudinal length of the plurality of reinforcement bars form an oblique angle with the planar edge of the fixing wall.

13. The wind power installation pylon segment according to claim 12 wherein the at least one first connecting body is anchored in the concrete body.

14. The wind power installation pylon segment according to claim 12 wherein the at least one first connecting body is fixedly attached by a welding joint to the at least two of the plurality of reinforcing bars proximate each joint.

15. The wind power installation pylon segment according to claim 12 wherein the at least on first connecting body and the second connecting body includes an opening configured to receive an fastening structure therethrough to attach the first connecting body to the second connecting body.

16. The wind power installation pylon segment according to claim 12 wherein the oblique angle is between about 2 to 8 degrees.

* * * * *